May 17, 1955  A. E. BROWN  2,708,419
NEST PAD
Filed May 17, 1954

INVENTOR.
Arthur E. Brown

# United States Patent Office 2,708,419
Patented May 17, 1955

2,708,419
NEST PAD

Arthur E. Brown, Leipsic, Ohio

Application May 17, 1954, Serial No. 430,174

1 Claim. (Cl. 119—45)

This invention relates to nest pads for laying chickens or other poultry.

The average egg producer utilizes some sort of litter in a hen's nest. This practice is objectionable inasmuch as the hen will work the litter to the sides of the nest leaving a low spot in the center where the eggs will collect, leaving the eggs exposed with no protection against being smashed by tramping. Thus, such litter is contrary to the prevention of broken eggs.

It is accordingly a principal object of the present invention to provide a nest pad which will prevent eggs from becoming broken and soiled.

It is another object of the present invention to provide a nest pad of the above type having a raised central portion which will cause the eggs to shift to the sides of the nest where they will be protected.

It is still another object of the present invention to provide a nest pad of the above type which will eliminate the need for providing litter in nests to prevent the breakage of eggs.

It is still another object of the present invention to provide a nest pad of the above type which may be easily and readily removed for cleaning purposes.

Other objects of the present invention are to provide a nest pad bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which.

Figure 1:
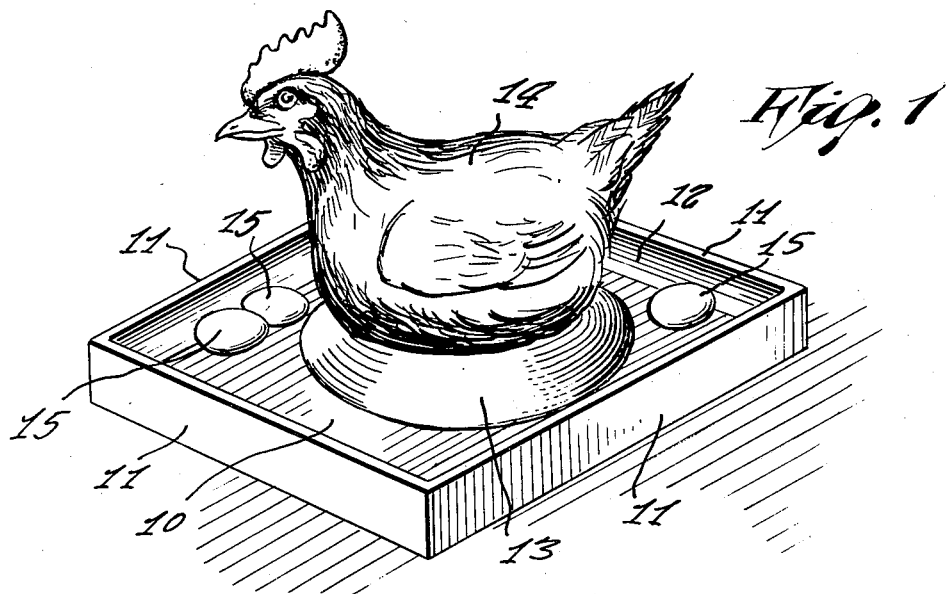
Figure 1 is a perspective view of the invention shown in operative use.
Figure 2:
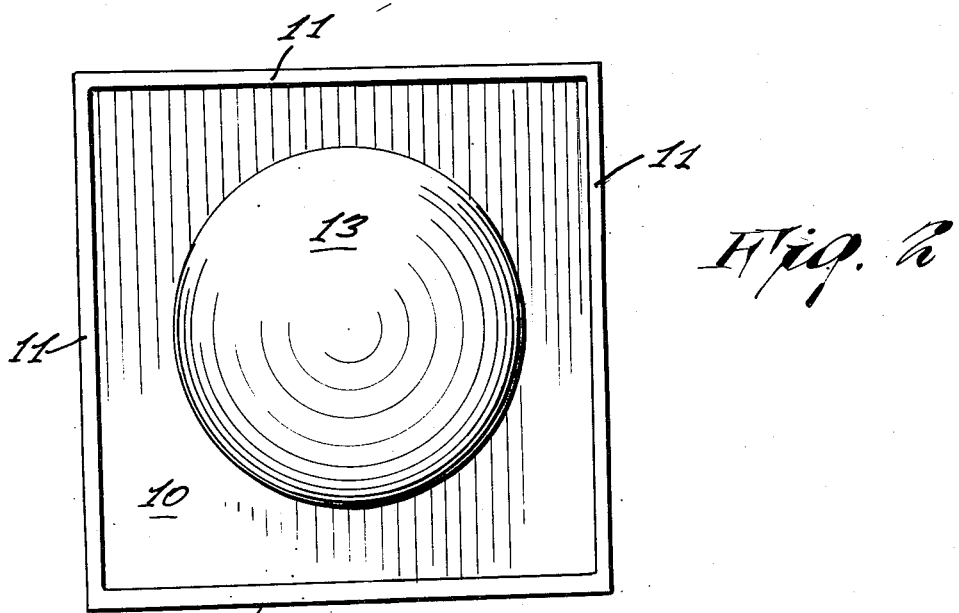
Fig. 2 is a top plan view thereof.

Referring now more in detail to the drawing, the invention includes a bottom wall 10 of sponge rubber or other similar material integrally formed around its periphery with a vertical wall 11, substantially as illustrated. The inner face of the wall 11 is concave, as at 12, as shown in Fig. 3.

The upper face of the wall 10 at its center is integrally formed with a convex circular portion 13 having its highest point at the center of the nest.

Figure 3:
Fig. 3 is a vertical sectional view taken through the nest and showing in phantom the original position of the egg when laid and in full lines the final position of the egg in the protected portion.

Thus, when the hen 14 (Fig. 1) lays an egg 15, the latter will be deposited on the highest point of the convex portion 13 and at laying will roll in the direction of the arrow of Fig. 3 to occupy a position adjacent the inner face of the side wall 11 and received within the concave portion 12 thereof. Thus the movement of the eggs 15 after laying to a protected position is insured and trampling and breakage of the eggs is thereby eliminated. The eggs may then be collected when desired from the outer portion of the nest.

The above nest is preferably formed of sponge rubber in the manner shown and may be easily and readily removed for cleaning purposes and due to its resilient nature will be comfortable for the poultry.

It should be apparent that there has been provided a nest pad wherein the need for litter is not only eliminated but wherein the eggs are prevented from being broken by automatically moving to the sides of the nest which are not occupied by the hens.

While various changes may be made in the detail construction, it shall be understood that such changes shall be within the spirit and scope of the present invention as defined by the appended claim.

Having thus set forth and disclosed the nature of my invention, what is claimed is:

A nest pad of deformable material comprising a flat, substantially rectangular bottom wall of sponge rubber or other substance having similar physical characteristics, a substantially vertical side wall integrally around the periphery of said bottom wall, the inner face of said side wall being substantially concave, and a raised, substantially circular convex central portion integrally formed on the upper face of said bottom wall whereby to automatically move eggs or the like deposited on said raised portion to a position at the outer portion of said bottom wall adjacent the inner concave face of said side wall whereby to prevent the eggs from becoming broken by trampling and to move the same into a protected position.

References Cited in the file of this patent

UNITED STATES PATENTS

| 10,675    | Ament   | Mar. 21, 1854 |
| 911,103   | Wolford | Feb. 2, 1909  |
| 1,578,692 | Thrasher| Mar. 30, 1926 |
| 2,606,525 | Johnson | Aug. 12, 1952 |

FOREIGN PATENTS

| 139,129 | Great Britain | Feb. 26, 1920 |
| 174,561 | Switzerland   | Apr. 1, 1935  |